N. MORGAN.
CAP SECURING MEANS FOR GREASE CUPS.
APPLICATION FILED NOV. 25, 1911.
1,039,781.
Patented Oct. 1, 1912.
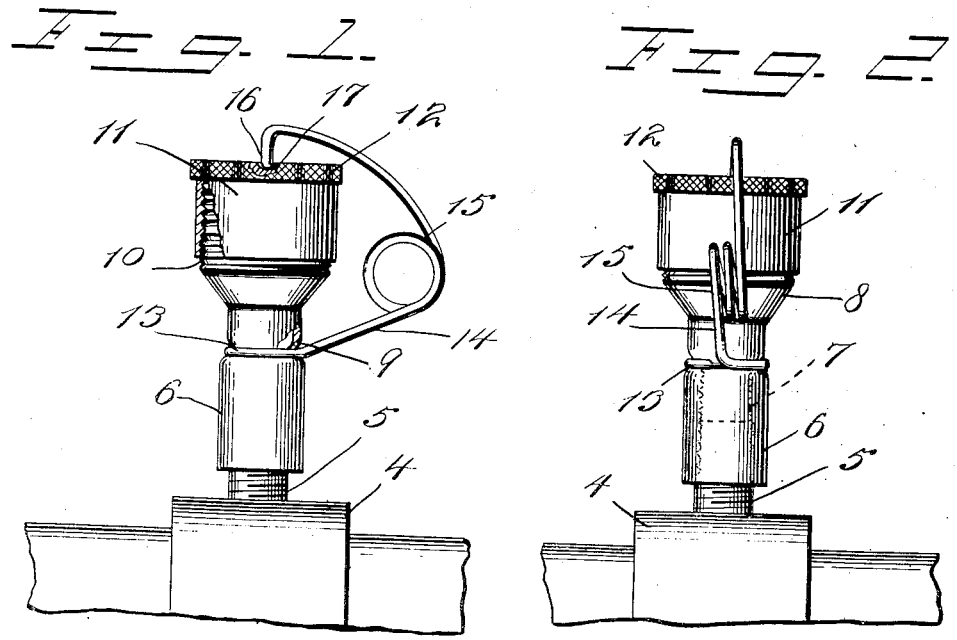
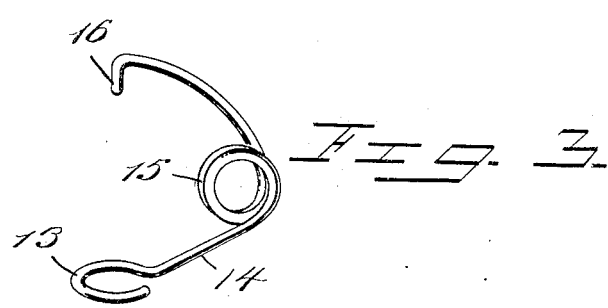

UNITED STATES PATENT OFFICE.

NELS MORGAN, OF FUNK, NEBRASKA.

CAP-SECURING MEANS FOR GREASE-CUPS.

1,039,781.  Specification of Letters Patent.  Patented Oct. 1, 1912.

Application filed November 25, 1911. Serial No. 662,519.

*To all whom it may concern:*

Be it known that I, NELS MORGAN, a citizen of the United States of America, and a resident of Funk, in the county of Phelps and State of Nebraska, have invented certain new and useful Improvements in Cap-Securing Means for Grease-Cups, of which the following is a specification.

This invention relates to lubrication and particularly to grease cups and to means for securing the caps of grease cups against accidental displacement.

An object of this invention is to provide novel means for yielding pressure on the caps of grease cups whereby movement of the cap with relation to the grease cup is obviated so that the jar and vibration incident to the use of machinery having such grease cups and covers or caps will not affect the cap to the extent of displacing or removing it from the cup.

A still further object of this invention is to provide a member having yielding pressure on a cap of a grease cup, the said member being readily manipulated for the purpose of releasing the pressure in order that the cap may be removed when the cup is to be filled or for other purposes.

With the foregoing and other objects in view, the invention consists in the details of construction and in the arrangement and combination of parts to be hereinafter more fully set forth and claimed.

In describing the invention in detail, reference will be had to the accompanying drawings, forming part of this specification wherein like characters denote corresponding parts in the several views, and in which—

Figure 1 illustrates a view in elevation of a fragment of a lubricating pipe with the grease cup and means for holding the cap of the grease cup applied thereto; Fig. 2 illustrates a view similar to Fig. 1 taken at a point at right angles from that which Fig. 1 is taken; and Fig. 3 illustrates a perspective view of the tension member.

In these drawings 4 denotes a housing to which the lubricating pipe 5 is connected, the said lubricating pipe having a nipple 6 threaded internally to receive the stem 7 of the grease cup 8, the said stem of the grease cup having a shoulder 9 intermediate its length. The grease cup is preferably externally threaded as shown at 10 for the purpose of receiving the threaded cap 11, the said threaded cap having a flange 12 at its top.

As a means for holding the cover of a grease cup, as heretofore explained, a tension member is provided comprising a metallic strip shaped to form an eye or loop 13 which fits over the stem 7 of the grease cup and is preferably interposed between the nipple 6 and the shoulder 9 wherein it is held loosely, but so as to prevent its displacement. The tension member has an arm 14 with a coil 15 intermediate its length forming a spring which will afford movement of the arm, but it will at the same time exert sufficient pressure or tension on the arm to hold the cover of the grease cup in the manner stated. As shown in the drawings, the outer or upper end of the arm 14 has an end 16 standing at an angle to the arm, which end bears against the upper surface of the cover or cap of the grease cup, preferably centrally thereof and the said cap may be provided with a slight recess 17 in which the end of the arm rests or is seated so that the grease cup may be rotated by hand to overcome the tension of the spring while the end of the arm is resting in the recess, or if desired, the end of the arm may be removed from the seat and by lateral pressure thereon, the said arm may be moved from over the top of the grease cup while the said cap is being manipulated.

I claim—

A grease cup, comprising an externally threaded grease receptacle, a recessed cap provided therefor, an externally shouldered stem; and a resilient arm; said arm having a loop adapted to engage said shoulder, a coil intermediate of its length, and a hook adapted to enter the recess in and exert pressure on the cap, thereby preventing accidental rotation of said cap.

In testimony whereof, I hereunto affix my signature in the presence of two witnesses.

NELS MORGAN.

Witnesses:
P. C. FUNK,
J. P. SMITH.